United States Patent
Boersch et al.

(10) Patent No.: US 10,217,535 B2
(45) Date of Patent: Feb. 26, 2019

(54) DEVICE AND METHOD FOR REMOVING CONTAMINATED MATERIAL

(71) Applicant: EnBW Energie Baden-Württemberg AG, Karlsruhe (DE)

(72) Inventors: Fabian Boersch, Weinsberg (DE); Hartmut Feil, Schefflenz (DE); Josef Hess, Hassmersheim (DE); Martin Husfeldt, Mosbach (DE); Markus Reuss, Stuttgart (DE); Ralf Gross, Schefflenz (DE); Sebastian Hentschel, Karlsruhe (DE)

(73) Assignee: EnBW Energie Baden-Württemberg AG, Karlsruhe (DE)

( * ) Notice: Subject to any disclaimer, the term of this patent is extended or adjusted under 35 U.S.C. 154(b) by 95 days.

(21) Appl. No.: 15/316,336

(22) PCT Filed: Jun. 5, 2015

(86) PCT No.: PCT/EP2015/062604
§ 371 (c)(1),
(2) Date: Dec. 6, 2016

(87) PCT Pub. No.: WO2015/185739
PCT Pub. Date: Dec. 10, 2015

(65) Prior Publication Data
US 2017/0154695 A1    Jun. 1, 2017

(30) Foreign Application Priority Data

Jun. 6, 2014   (DE) .................. 10 2014 210 947

(51) Int. Cl.
*B28D 1/04*   (2006.01)
*G21D 1/00*   (2006.01)
(Continued)

(52) U.S. Cl.
CPC ............. *G21D 1/003* (2013.01); *B28D 1/045* (2013.01); *B28D 1/048* (2013.01); *B28D 1/18* (2013.01);
(Continued)

(58) Field of Classification Search
CPC .......... B28D 1/045; B28D 1/048; B28D 1/26; G21D 1/003
(Continued)

(56) References Cited

U.S. PATENT DOCUMENTS

| 637,961 | A | * | 11/1899 | Gillies | ................... | B28D 1/045 |
| | | | | | | 125/14 |
| 2,238,757 | A | * | 4/1941 | Orville | .................... | A47L 11/38 |
| | | | | | | 15/183 |

(Continued)

FOREIGN PATENT DOCUMENTS

| DE | 3916186 | 11/1990 |
| FR | 2459716 | 1/1981 |
| GB | 2301221 | 11/1996 |

OTHER PUBLICATIONS

KR20100024796 (A)—The Concrete Surface Decontamination Machine Mounted on X-Y Table; Inventor Ki Won Lee, et al; Mar. 8, 2010; pp. 1 -11.
(Continued)

*Primary Examiner* — George Nguyen
(74) *Attorney, Agent, or Firm* — Bond Schoeneck & King, PLLC; George McGuire

(57) ABSTRACT

The present invention relates to a device (10) and a method for removing contaminated material from a wall, the device (10) comprising
suction plates (26) which fix a support system (13) of the device (10) to the wall by means of negative pressure, and
(Continued)

a first rotating tool (14) that has impact cutters (16) in the circumferential direction. Disc-shaped saw blades (20) are provided in a second rotating tool (18) mounted upstream of the first rotating tool (14) in the working direction.

10 Claims, 10 Drawing Sheets

(51) Int. Cl.
　　　B28D 1/18　　(2006.01)
　　　B28D 1/26　　(2006.01)
　　　G21F 9/00　　(2006.01)
　　　G21F 9/28　　(2006.01)
(52) U.S. Cl.
　　　CPC .............. *B28D 1/26* (2013.01); *G21F 9/001* (2013.01); *G21F 9/28* (2013.01)
(58) Field of Classification Search
　　　USPC .................................. 451/354, 194; 125/14
　　　See application file for complete search history.

(56) References Cited

U.S. PATENT DOCUMENTS

| | | | | |
|---|---|---|---|---|
| 2,362,699 A * | 11/1944 | Kilian | ...................... | B24B 3/54 125/11.03 |
| 2,592,001 A * | 4/1952 | Bereit | ..................... | B28D 7/04 125/14 |
| 4,199,905 A * | 4/1980 | Neidigh | .................... | B08B 9/08 180/901 |
| 4,756,298 A * | 7/1988 | Spiegelberg | ........... | B23D 47/10 125/14 |
| 4,836,494 A * | 6/1989 | Johnsen | ................. | B28D 1/045 125/14 |
| 4,969,914 A * | 11/1990 | Ikegaya | .................. | B24B 7/241 451/160 |
| 5,001,870 A * | 3/1991 | Yokota | .................... | B24C 1/045 29/426.3 |
| 5,025,523 A * | 6/1991 | Zappa | ..................... | A47L 11/38 15/21.1 |
| 5,230,270 A * | 7/1993 | Bertrand | ............. | B23D 45/048 125/14 |
| 5,233,968 A * | 8/1993 | Vannucci | ................. | B28D 1/26 125/14 |
| 5,240,503 A * | 8/1993 | Levy | ......................... | A47L 1/02 118/323 |
| 5,964,645 A * | 10/1999 | Jemt | ....................... | B24B 7/182 451/354 |
| 2006/0169269 A1 * | 8/2006 | Baratta | .................. | B23D 47/00 125/13.01 |

OTHER PUBLICATIONS

Genies, Sascha, Prof. Dr-Ing., Riickbautechnologien von kemtechnischen Anlagen, Symposium Kompetenzbereich Systeme and Prozesse, Forschungszentrum Karlsruhe, Mar. 24, 2010 (no English translation available).
International Search Report Form PCT/ISA/220, International Application No. PCT/EP/2015/062604, pp. 1-5.

* cited by examiner

DEVICE AND METHOD FOR REMOVING CONTAMINATED MATERIAL

CROSS-REFERENCE TO RELATED APPLICATION

The present application is the U.S. National Stage Filing under 35 U.S.C. 371 of PCT Application Number PCT/EP2015/062604, filed Jun. 5, 2015, which claims priority to 102014210947.7, all of which are hereby incorporated by reference.

The present invention relates to a device for removing contaminated materials from a wall according to the preamble of claim 1. Another part of the present invention is a method for removing contaminated material from a wall according to the preamble of claim 11.

When decommissioning nuclear facilities, the minimisation of contaminated waste is of the highest priority. This also applies to the efficient decontamination of concrete floors and walls in buildings used to protect the nuclear facility or parts thereof from any external influences. In order to simplify the language used here, reference is made mostly to a single wall in conjunction with the claimed invention; however, this also refers to the floors and ceilings of the rooms in all cases.

During the course of the operation of a nuclear facility, which may sometimes be over several decades, this may result in contamination of the internal boundary surfaces (walls, floors and ceiling) of the building protecting the facility. As a result, such buildings may only be demolished once decontaminated in a conventional manner.

With regard to such buildings, decontamination involves removing the surfaces of the internal boundary surfaces (walls, floors and ceiling) up to a depth of approximately 10 mm. Only the material removed in this way may potentially contain radioactive particles and must therefore be disposed of separately. The rest of the decontaminated building can be demolished in the same way as any other building.

DE 39 16 186 A1 shows a device for removing a layer from the container wall of a fuel element pool. The device has suction plates in place in order to attach the device to the container wall. The layer is removed by a tool designed as a spatula or milling machine.

A stand-alone device had previously been developed for removing the surfaces of (concrete walls), the former crushing and removing the surface of the wall in a similar manner to a hammer mill. This is a remote-controlled support system in which the actual device is positioned with a rotating roller. The roller has a number of different impact cutters on its circumference. The device is known by the name of "AMANDA".

When operated, the device is sucked closely onto the wall with the aid of suction cups or suction plates. The work unit is able to climb the room walls on its own, thus removing the surface of the wall gradually.

The disadvantage associated with this well-known device lies in the fact that it is not efficient enough to decontaminate the interior walls of a decommissioned nuclear facility, for example, within a sufficiently short period of time. Furthermore, the wear and tear of the impact cutters, the energy requirements of the device and the depth of the material removal are all still unsatisfactory.

The purpose of the invention is to further develop this well-known device in order to enable the additional removal of concrete surfaces even up to a depth of 10 millimeters in a single operation.

This task is achieved in accordance with the present invention by way of the fact that the impact roller is preceded by a second rotating tool in the working direction which includes several disc-like saw blades spaced from one another. The saw blades must preferably be designed in such a way so that they do not require any coolant.

This means that the device in accordance with the present invention has two rotating tools arranged in succession, i.e. tools primarily designed as drums or rollers. To begin with, the rotating tool cuts grooves (optionally at a depth of between 1 mm and 10 mm) into the wall in the working direction by way of the saw blades. The rotating tool designed with impact cutters then removes any material (concrete) remaining within the grooves up to the desired depth of up to 10 mm. The webs between the grooves are much less stable than the "closed" surface of the wall before the slots are inserted, meaning therefore that the impact roller is able to remove the surface to the required depth in a quicker, more efficient manner that is subject to less wear and tear. Lower contact forces are required during operation thanks to the two rotating tools arranged in succession. As a result, this means that the entire system can be dimensioned in a lighter and smaller manner.

The surface is slit and removed in a single operation, meaning therefore that the total processing time is not increased and is even reduced in certain cases.

Cutting the grooves in the wall is a preparatory operation for the rotating tool with the impact cutters. In doing so, this also facilitates a significantly higher removal depth. The depth of the grooves in the walls essentially reflects the thickness of the layer that is to be removed from the wall. This is also possible even with extremely hard material in the wall, such as concrete.

The device and/or the processing device therefore processes the wall in a completely stand-alone manner and can be controlled remotely. To begin with, the device will preferably process a single web on the wall in a (vertical) direction. Then a support system on which the processing device is arranged is shifted parallel to the wall by the width of the previously processed web, with the next web being processed thereafter.

It is also possible that the processing device can be moved horizontally within the support system. This means that at least two webs can be processed on the wall without having to move the support system.

During the working process, the removed material is then immediately collected and/or sucked up, thus ensuring there is no contaminated material escaping in an uncontrolled manner from the processing device. The removed material is then disposed of in a legitimate manner.

An electrical safety cut-off device may also be provided which will bring the device back to its starting position and switch it off in the event of any danger. The safety cut-off device may also include contact strips and/or vacuum sensors.

Provision is made in the preferred embodiment for the saw blades to be coated with hard cutting materials, such as diamond, DLC (=Diamond Like Carbon) or a similar material. In doing so, the service life of the saw blades is increased and the energy requirements for the slots in the wall are reduced.

A contact pressure of approx. 800 N between the roller and the saw blades may be sufficient enough. Testing has shown that the rotating tool with the saw blades delivers good results at a speed of approx. 2400 rpm in the processing device.

During testing, grooves of approx. 500 m in size were able to be cut/sawed into a concrete wall using a set of diamond saw blades.

Provision is also made in the preferred embodiment for an axis of rotation of the first rotary tool (with impact cutters) and an axis of rotation of the second rotary tool (with saw blades) to be arranged in parallel. Testing has shown that more than 400 m or so of concrete can be removed using a set of impact cutters assuming there is such an arrangement of the axes of rotation.

If the axes of rotation of the rollers run parallel to each other, the processing device is particularly compact.

The processing device can be guided along with the aid of roller during the removal of contaminated material on the wall.

The first and second tools will preferably have their own drive system. This may be a hydraulic motor or an electric motor, for example.

Provision may be made for the speed of both rotating tools to be different. This makes it possible for the second rotating tool to rotate faster than the first rotating tool with impact cutters.

Provision is also made in an alternative embodiment for the axis of rotation of the first rotating tool and the axis of rotation of the second rotating tool to be aligned with each other at an angle of more than 0° (preferably greater than 30° and even better if greater than 60°). This has the advantage that the impact cutters strike the remaining material to be removed from the grooves from the side so that the webs break off partially and need to be ground up and/or knocked less intensively. In doing so, less energy and force need to be expended, thus extending the service life of the impact cutters and reducing energy consumption.

Provision is also made in a further development of this embodiment for the axis of rotation of the first rotating tool and the axis of rotation of the second rotating tool to be arranged at an angle of 90° to each other. To achieve this, the first rotating tool needs to be moved by way of a separate feeding device. With regard to this embodiment, the rotating tool with saw blades will, for example, cut vertically running grooves into the wall.

The impact roller then moves in a horizontal direction over the material remaining in between the grooves. The reduced power level achieved for the first rotating tool is at its greatest here, with the service life of the impact cutters also at its highest too.

Provision is also made for the processing device to be arranged in a height-adjustable manner in the support system and for the support system to be able to be moved on the floor. With regard to height adjustment, the support system will preferably have several reciprocally movable systems for height adjustment purposes, whereby at least one of the systems is made up of telescopically designed columns that can preferably be extended in a vertical manner by way of a separate drive motor. In doing so, the processing device in the support system can be raised to a height of approximately 4.5 m above the ground in order to remove the contaminated layer from the wall. A second system for height adjustment purposes may also move within the telescopically designed columns.

The support system is preferably arranged on a base plate which is placed on a dolly. The dolly can be supplied with electrical energy and remotely controlled via an accumulator or a mains cable.

The dolly is preferably moved on crawlers. In doing so, the ground contact area is increased to improve traction on uneven ground on the one hand and to distribute the weight evenly on the other hand. Such dollies are well-known forms of transport for pianos or wings, for example. You can even climb stairs whilst being able to ensure a horizontally aligned transport surface at all times too.

Provision is also made for the drive motors for both of the rotating tools to include a hydraulic drive as well, whereby each hydraulic pump for the hydraulic drive is preferably arranged outside of the support system. Arranging the hydraulic pump outside of the support system helps to reduce the weight of the processing device.

In the case of hydraulic drive, hydraulic energy (pressure*volume) is converted into mechanical work. Such drives are well-known over a long period of time, very reliable and can be easily controlled and regulated too.

Provision is also made for several suction plates (e.g. eight suction plates) to be moved on the wall by way of pneumatically or electrically driven (working) cylinders, whereby a single vacuum device generates a negative pressure underneath the suction plates. The vacuum device may, for example, include a venture tube. By using such a vacuum device, a contact pressure of approximately 1700 N can be generated between the suction plates and the wall. It is only as a result of this that the support system is fixed to the wall during processing; no additional devices are required to absorb the forces generated during the removal of the contaminated covering of the wall. This leads to significant savings in terms of time, effort and cost.

Further advantages arise from the following description and the appended figures. The following is shown in schematic form.

FIG. 1 shows device 10 in accordance with the present invention for removing contaminated material from a wall in the form of a schematic block diagram. The contaminated material to be removed is preferably concrete or another hard and/or brittle building material.

Device 10 includes a processing device 12, which is arranged in a support system 13 that can be moved on the floor by way of a dolly (not illustrated). The support system 13 is, for example, a metal frame in which the most important components of device 10 are arranged and can be moved or slid along one or more axes.

Figure 2:
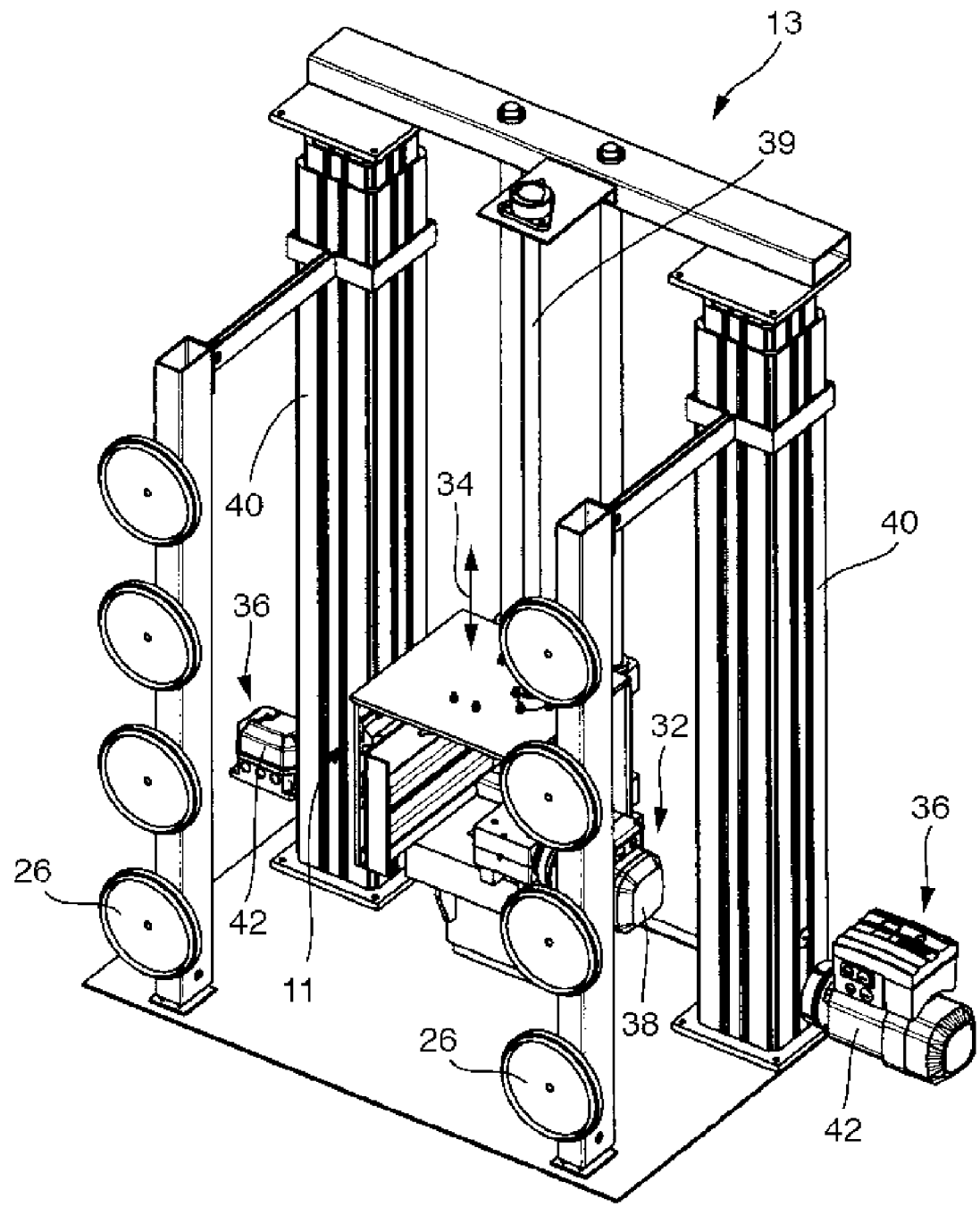
FIG. 2 shows a support system to hold the processing device of the device in accordance with the present invention in a perspective view.
Figure 3:
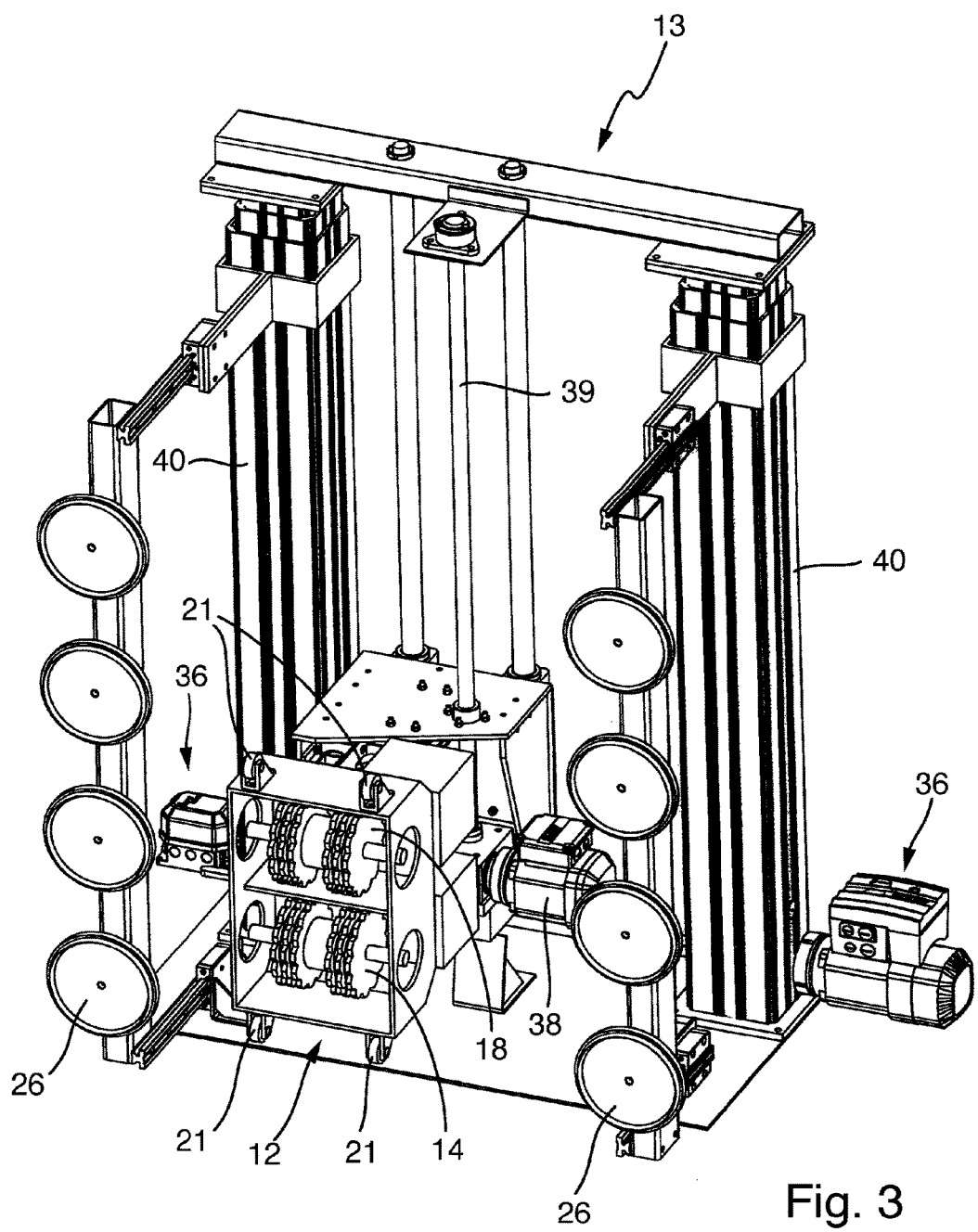
FIG. 3 shows the support system from FIG. 2 with the inserted processing device.
Figure 4:
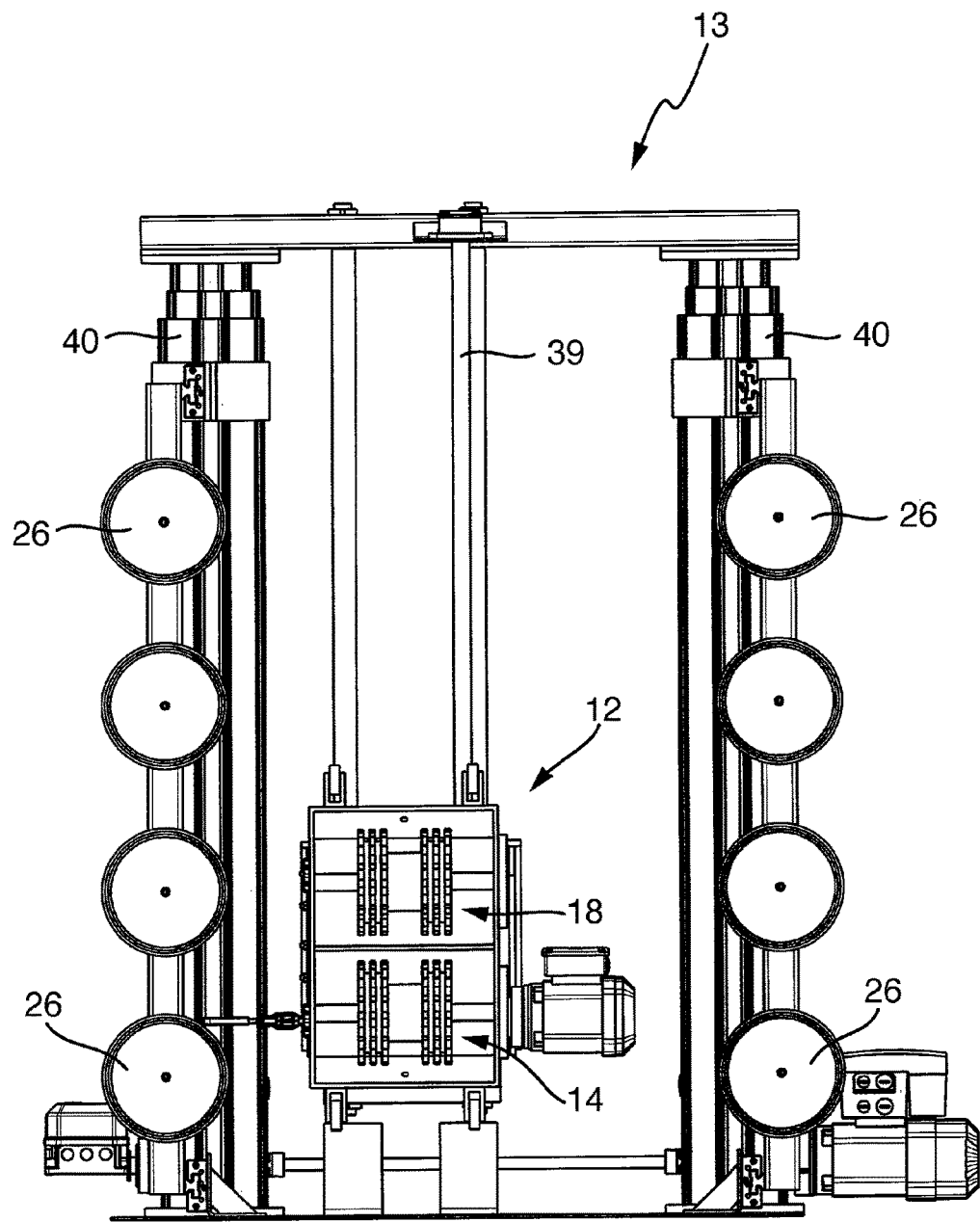
FIG. 4 shows the support system from FIG. 2 or 3 in a frontal view.

FIGS. 2 and 3 show a perspective view of the support system 13, whereby the processing device 12 is not illustrated in FIG. 2, but rather slot 11 for the processing device 12. FIG. 3 shows the complete support system 13. FIG. 4 shows the support system 13 in a frontal view.

Figure 1:
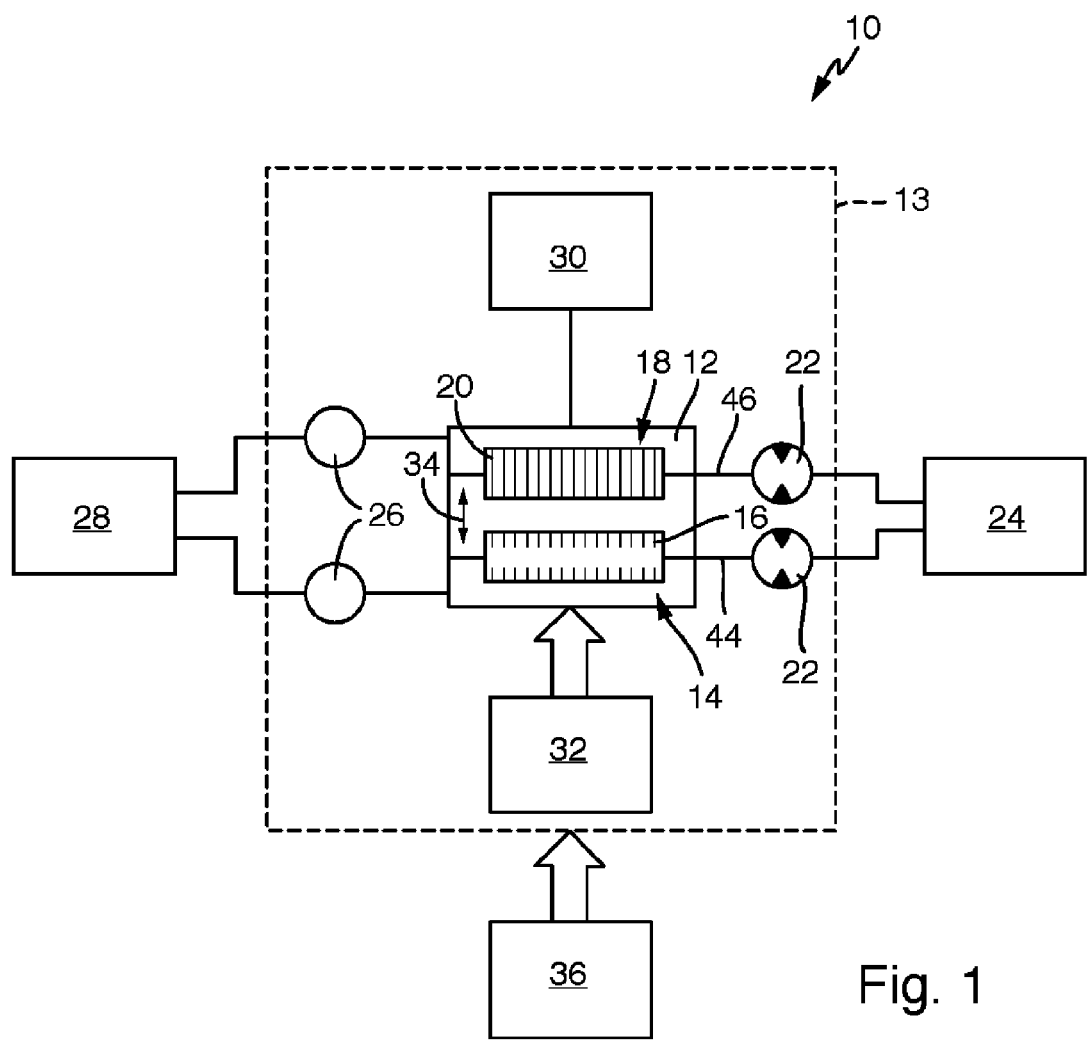
FIG. 1 shows a block diagram of a device in accordance with the present invention for removing contaminated material from a wall.
Figure 5:
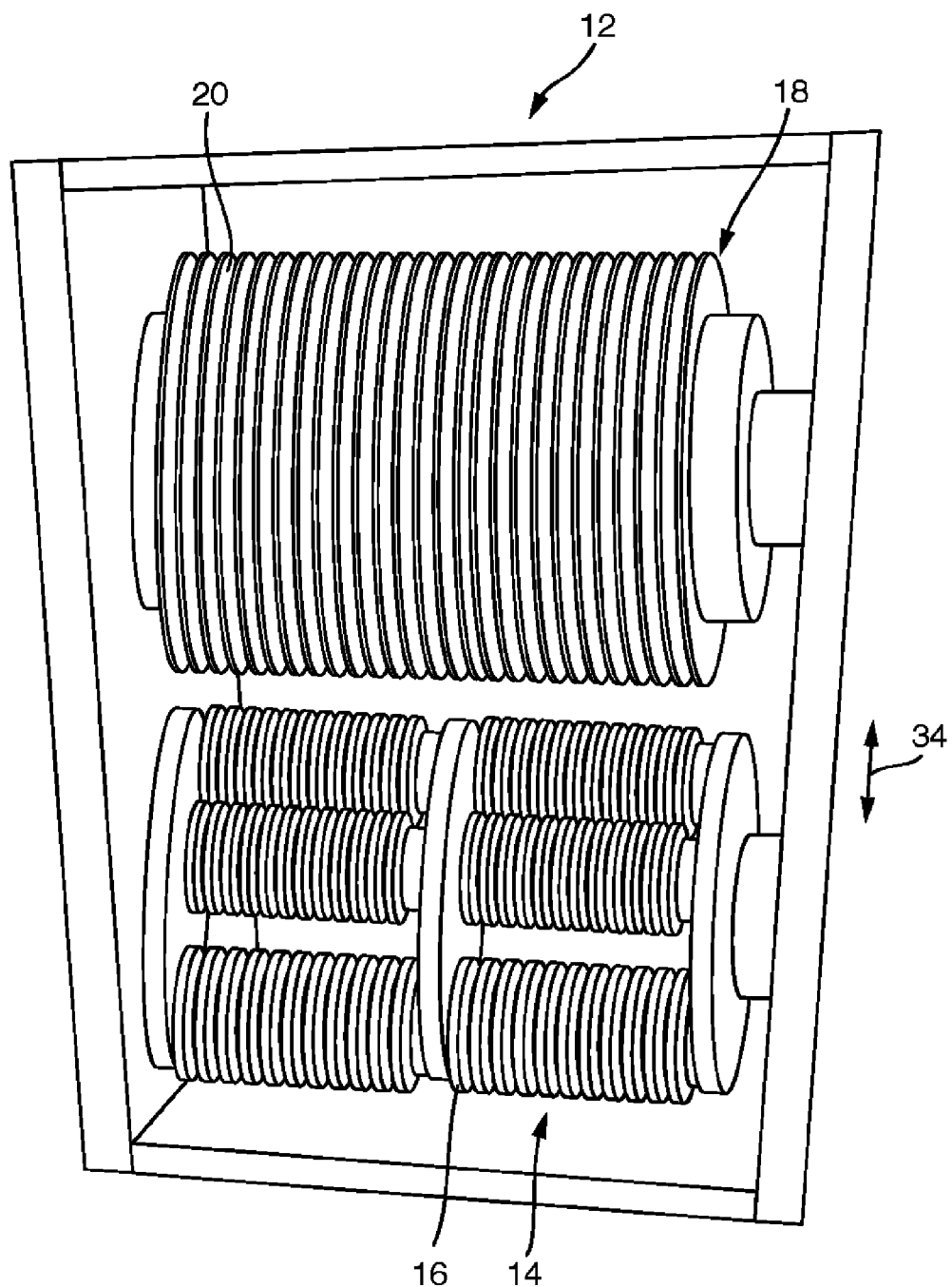
FIG. 5 shows the processing device of the device in accordance with the present invention in its initial embodiment.
Figure 6:
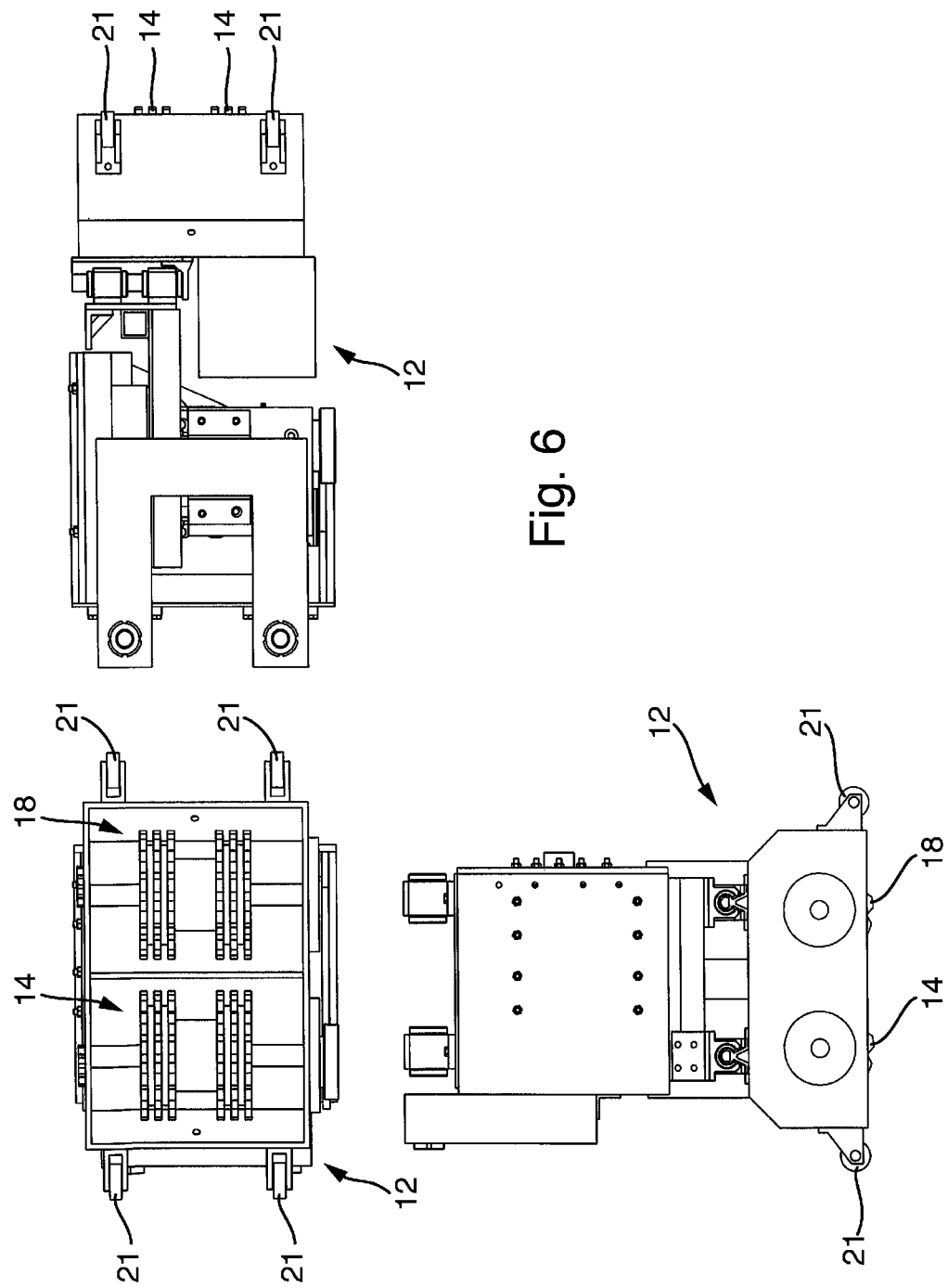
FIG. 6 shows the processing device from FIG. 5 in three different views.

The processing device 12 is illustrated in a perspective manner in FIG. 5 and includes a rotating tool 14 which has impact cutters 16 on its circumference (see, for example, FIGS. 1 and 5). The first rotating tool 14 preferably operates as an impact roller. FIG. 6 also shows the processing device 12 from different views, and FIG. 7 shows an area of the support system with the processing device 12 in a side view.

The processing device 12 also includes a second rotating tool 18 which has several disc-like saw blades 20 spaced from one another, similar to a circular saw.

Figure 7:
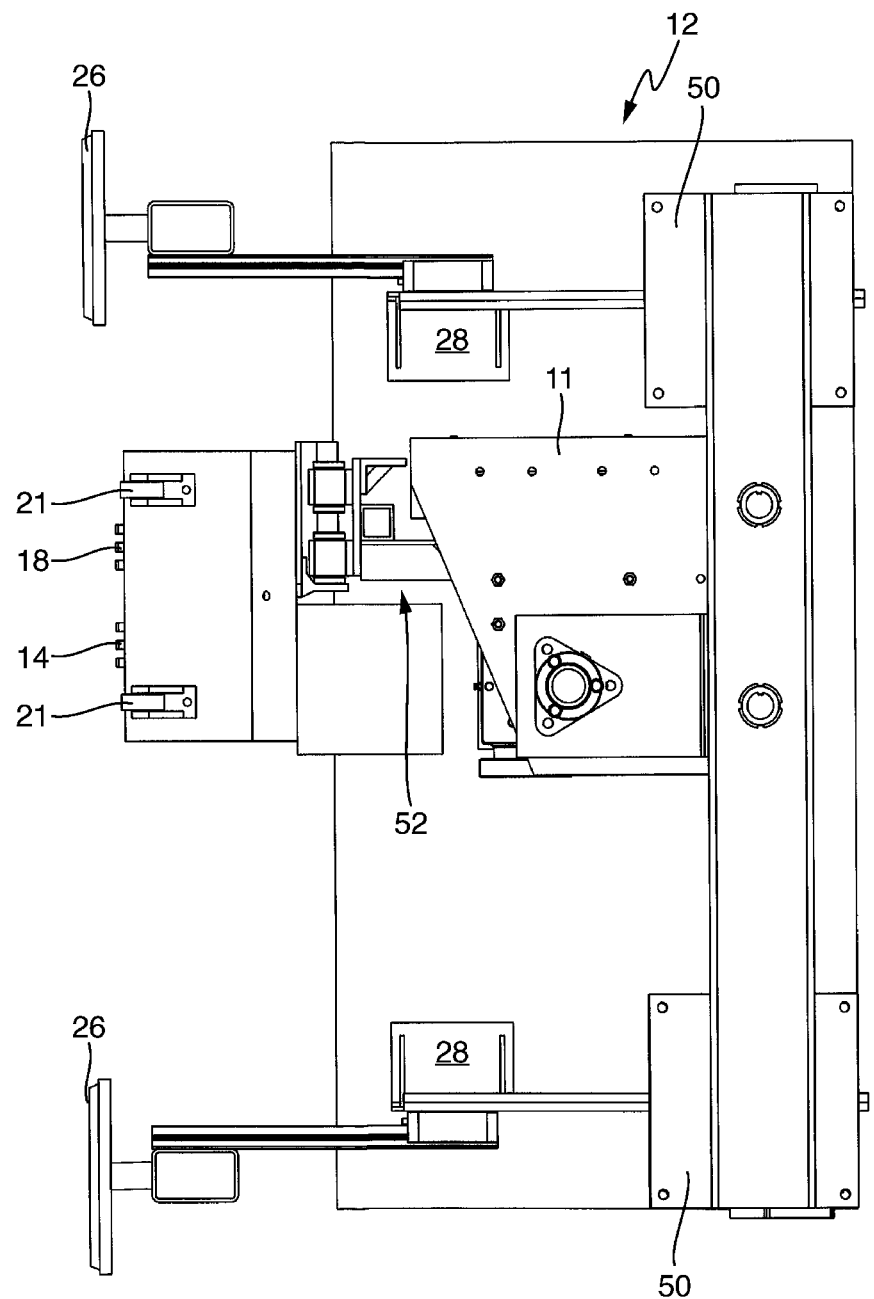
FIG. 7 shows an area of the support system with the processing device from FIGS. 5 and 6 in a side view.
Figure 8:
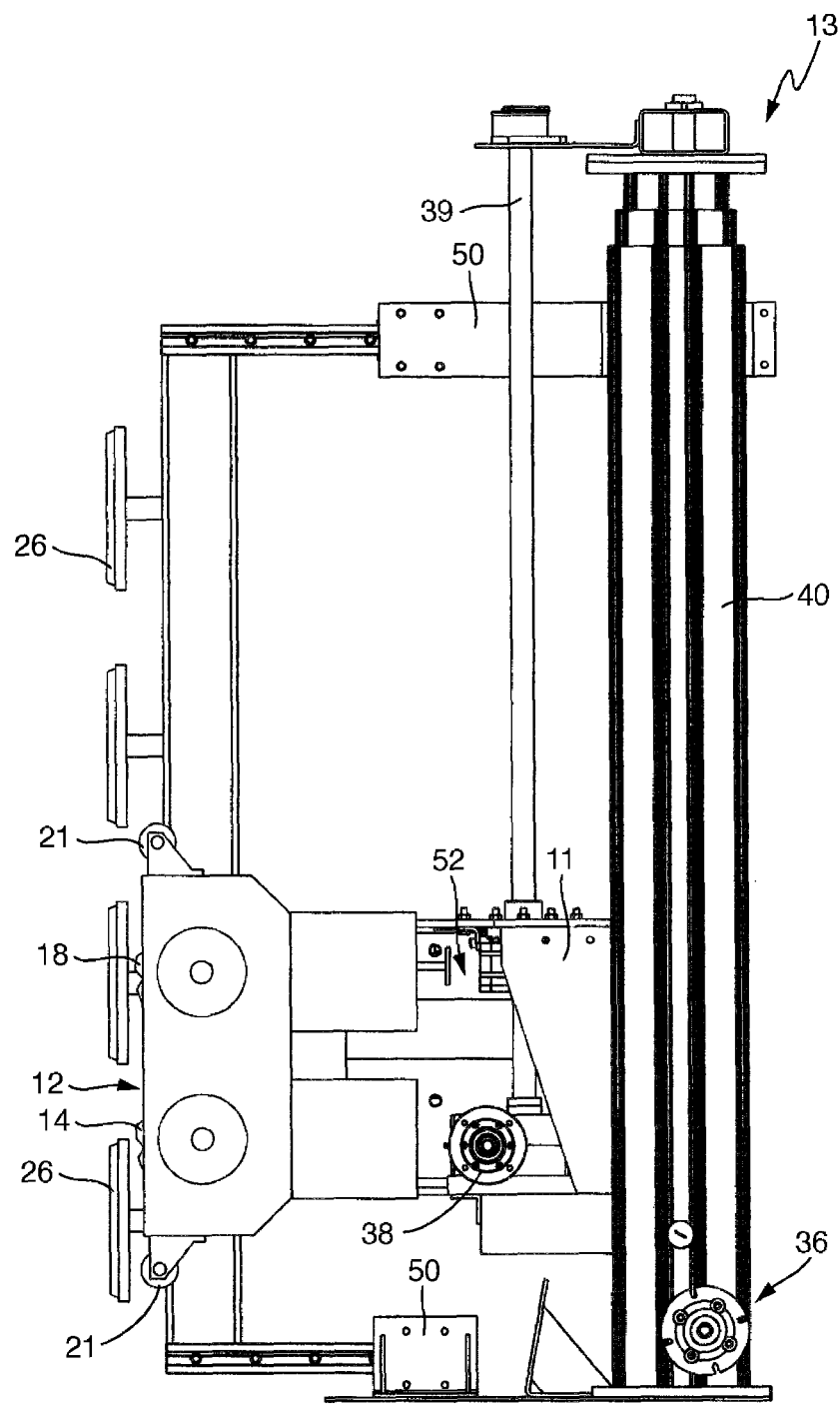
FIG. 8 shows the complete support system in a side view.

The processing device 12 can be guided along with the aid of rollers 21 during the removal of contaminated material on the wall (see FIG. 6, 7 or 8).

Both tools 14, 18 are preferably driven by a separate hydraulic motor 22. The hydraulic pump 24 required to operate the hydraulic motors 22 is preferably arranged outside the support system 13.

The support system 13 can be fixed to the wall by way of several suction plates 26 (e.g. eight suction plates 26). The suction plates 26 can be automatically moved onto the wall by way of electric, pneumatic or hydraulic working cylinders. A vacuum device 28 generates a negative pressure between the wall and the suction plates 26, enabling a contact pressure of approx. 1700 N to be generated between the suction plates 26 and the wall. The vacuum device 28 is also preferably arranged outside the support system 13.

In order to remove the material removed from the wall, the processing device 12 is accommodated in housing and connected to a suction and collection device 30. The housing may be sealed by way of brush seals or other seals. This essentially ensures that there is no removed material, including contaminated dust, escaping from the section of the processing device 12. The material removed from the suction and collection device 30 is then treated and/or disposed of in accordance with the statutory regulations in place.

The device 10 works in a completely stand-alone manner and can be controlled remotely. In order to systematically remove material on the walls, the device 10 also includes two actuators 32, 36. The first actuator 32 moves the processing device 12 vertically in the support system 13 via a drive motor 38 (see arrow 34 in FIG. 2). The processing device 12 and/or the slot 11 for the processing device 12 is guided, for example, to a guide rail 39. The guide rail 39 could also be designed as a threaded spindle, whereby the slot 11 then has an internal thread in which the threaded spindle is rotated by the drive motor 38.

The support system 13 can be vertically extended upwards by way of the second actuator 36. The support system 13 has telescopically designed columns 40 for height adjustment purposes, i.e. it can, for example, be vertically extended by way of a separate drive motor 42 (see FIG. 2).

FIGS. 5 and 6 show the processing device 12 in detail. In FIG. 5, the first rotating tool 14, which has impact cutters 16 inside its circumference, is arranged in the lower section of the processing device 12. The first rotating tool 14 may be designed as a drum or roller. The impact cutters 16 are arranged in a circumferentially spaced manner in the rotating tool 14 and are preferably made of hardened metal or carbide. During operation, a concrete layer with a thickness of approx. 10 mm may be removed over a length of approx. 400 m using a set of impact cutters 16.

The second rotating tool 18, which has saw blades 20 spaced from one another as described above, is arranged in the upper section of the processing device 12. The saw blades 20 are preferably coated with diamond, DLC (=Diamond Like Carbon) or another very hard cutting material. During operation 20, grooves of at least 10 mm depth may be cut into a concrete wall over a length of at least 500 m using a set of diamond saw blades 20.

The axis of rotation 44 of the first rotating tool 14 and the axis of rotation 46 of the second rotating tool 18 run parallel in the initial embodiment.

An example method in accordance with the present invention for removing contaminated materials from a wall makes use of device 10 and includes the following remote-controlled operations in the initial embodiment:

Movement of the support system 13 on the wall by way of a dolly, whereby the support system 13 may be arranged with a base plate on the dolly.

Application of the suction plates 26 to the wall by pressing the working cylinders assigned to the suction plates 26.

Generation of negative pressure between the suction plates 26 and the wall to be processed in order to fix the support system 13 to the wall by pressing the vacuum device 28. The processing tools are then driven over the wall by way of pneumatic cylinders 52.

Approaching of processing device 12 to the wall so that the rotating tool 18 with the saw blades 20 and then the rotating tool 14 with the impact cutters 16 can process the wall in succession.

The operation in accordance with the present invention stipulates that grooves are cut into the concrete by the rotating tool 18 with the saw blades 20 to begin with. Then the rotating tool 14 designed with impact cutters 16 removes the remaining webs between the grooves. This is done in a single operation. The depth of the sawed grooves is essentially responsible for determining the thickness of the removed layer of the wall. If the processing device has reached the end of its travel path within the support system, then the processing device 12 is moved within the support system 13 by the actuator 32 in a (vertical) direction so that a vertically running web is processed on the wall.

Extension of support system 13 by vertically extending the telescopically designed columns 40. The drive motor 38 is thus actuated.

If the max. height is reached, the support system 13 and the processing device 12 are both returned to the original starting position. After reaching this position, the suction plates 26 are then detached from the wall through the equalisation of the negative pressure. The support system 13 is then moved horizontally by a web width through use of the dolly.

The working steps b) to g) are then repeated.

Figure 9:
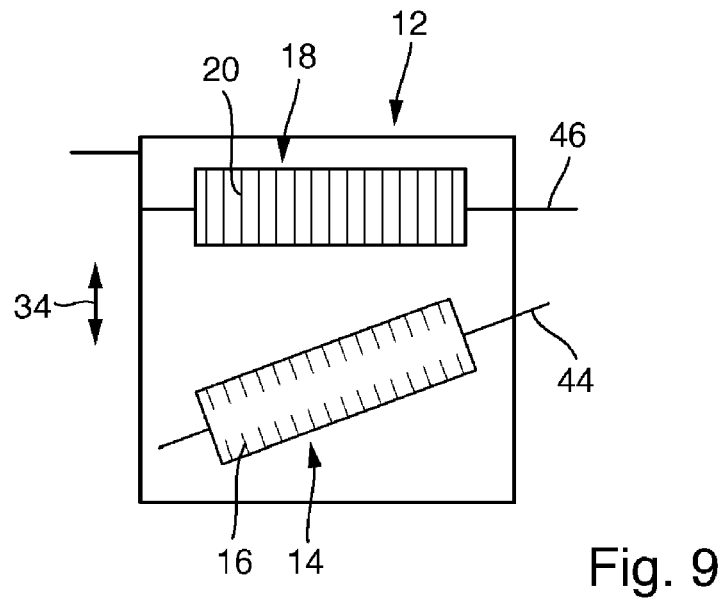
FIG. 9 shows the processing device of the device in accordance with the present invention in its second embodiment.

FIG. 9 shows a schematic illustration of the processing device 12 in a second embodiment of device 10. In the second embodiment, the axes of rotation 44 and 46 of both rotating tools 14, 18 run at an angle of 0°, e.g. at an angle of 35°. The working step associated with this method is identical to the initial embodiment described above. This second embodiment has the advantage in that the impact cutters 16 can strike the remaining material to be removed in between the grooves from the side, i.e. in a diagonal manner. This means that less force has to be applied here; the service life of the impact cutters 16 can therefore be extended.

Figure 10:
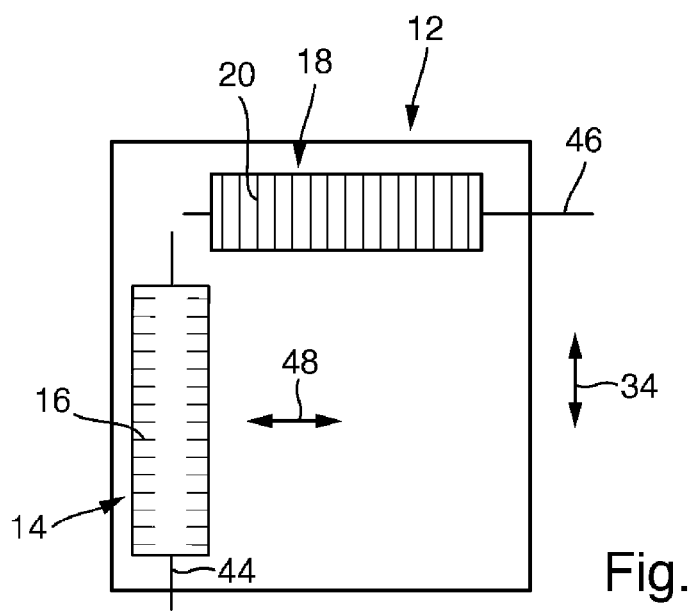
FIG. 10 shows the processing device of the device in accordance with the present invention in its third embodiment.

FIG. 10 shows a schematic illustration of the processing device 12 in a third embodiment of device 10. In the third embodiment, the axes of rotation 44 and 46 of both rotating tools 14, 18 run at an angle of 90°. The working step associated with this method is somewhat different in the third embodiment.

Procedural step d) changes in the sense that—as is already well-known—grooves are indeed cut into the concrete to begin with by the rotating tool 18 with saw blades 20. The rotating tool 14 designed with impact cutters 16 then removes the remaining layer in between the grooves in such a way that the rotating tool is moved over the grooves at right angles (see arrow 48 in FIG. 10).

To achieve this, an additional displacement device not shown in FIG. 10 shall be required. This is also done sequentially in a single operation, whereby the vertical processing of a web on the wall is carried out in a successive manner. What this means is that grooves will only be cut into a partial section of the wall by the rotating tool 18, whereby this partial section includes the length of the rotating tool 14. The processing device 12 then remains in place until the rotating tool 14 has removed the remaining layer in between the grooves. The processing device 12 is then moved even further vertically (see arrow 34 in FIG. 10). In the third embodiment, the power saving for the first rotating tool 14 is at its greatest, with the service life of the impact cutters 16 also at its longest.

Figure 11:
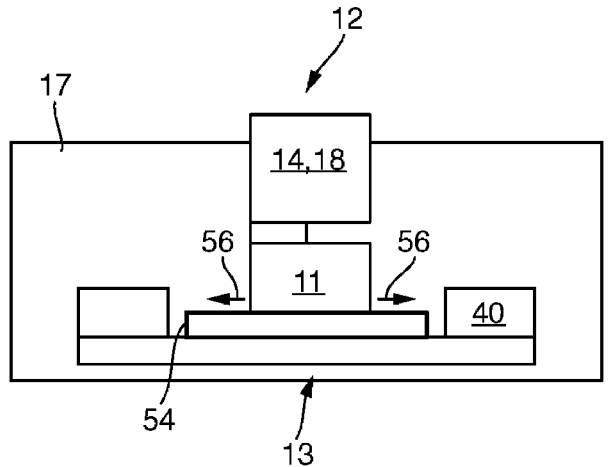
FIG. 11 shows the processing device of the device in accordance with the present invention in its fourth embodiment.
Figure 12:
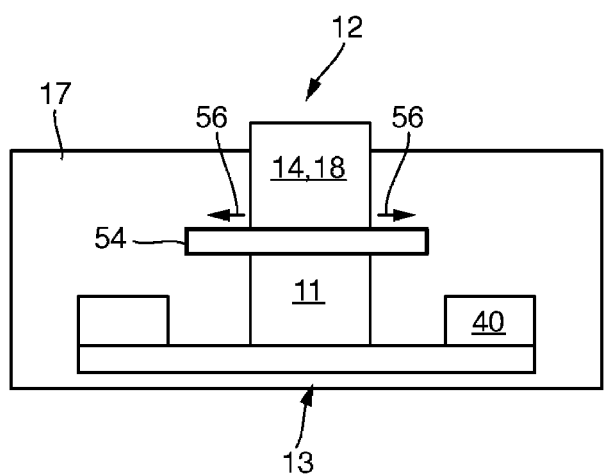
FIG. 12 shows an additional variant of the fourth embodiment from FIG. 11.

FIGS. 11 and 12 show a schematic illustration of the processing device 12 in a fourth embodiment of device 10. FIGS. 11 and 12 show the processing device 12 in a top view. The processing device 12 is illustrated in two blocks:

The first block illustrates both rotating tools 14 and 18, and the second block illustrates the slot 11 for the two rotating tools 14 and 18. In the fourth embodiment, the processing device 12 is arranged on a horizontally movable device 54. The direction of movement of the horizontally movable device 54 is indicated by arrow 56. The horizontally movable device 54 can therefore be connected directly to the support system 13 (see FIG. 11) or it can be arranged in between the rotating tools 14 and 18 and the slot 11 (see FIG. 12) so that only the rotating tools 14 and 18 can be moved horizontally. This embodiment has the advantage in that at least two webs on the wall can be processed without having to move the support system 13.

Figure 13:
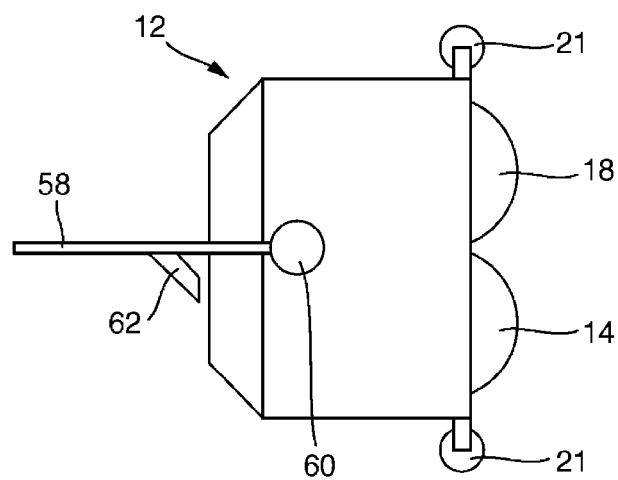
FIG. 13 shows a further development of the processing device from FIGS. 5 to 7.

FIG. 13 shows a further development of the processing device 12 illustrated above. Here, a guide rod 58 has a hinge 60 via which the processing device 12 can be always guided parallel to the wall. The rollers 21 act as a spacer for the processing device 12 in relation to the wall. Any unevenness on the wall can therefore be offset. The guide rod 58 also has a safety catch 62 which stops the processing device 12 from tilting when it is in contact with the wall and/or when it moves away from the wall.

The invention claimed is:

1. Device for removing contaminated materials from a wall, the device comprising
    suction plates which fix a support system of the device to the wall by means of a negative pressure, and
    a rotating tool which has impact cutters in the circumferential direction, characterized in that disc-like saw blades spaced from one another are arranged in a second rotating tool upstream of the rotating tool in the working direction;
    wherein the device can be arranged in the support system in a height-adjustable manner and the support system can be moved on the floor by way of a dolly.

2. Device according to claim 1, characterized in that the saw blades comprise diamond discs.

3. Device according to claim 1, characterized in that an axis of rotation of the first rotating tool and an axis of rotation of the second rotating tool are arranged parallel to each other and behind each other in a processing device.

4. Device according to claim 1, characterized in that the axis of rotation of the first rotating tool and the axis of rotation of the second rotating tool are arranged at an angle greater than 0° to each other.

5. Device according to claim 4, characterized in that the axis of rotation of the first rotating tool and the axis of rotation of the second rotating tool are aligned at an angle of 90° to each other.

6. Device according to claim 1, characterized in that the support system has telescopically designed columns which can be extended in a vertical manner.

7. Device according to claim 1, characterized in that the drive motors for both rotating tools each comprise a hydraulic drive, whereby a hydraulic pump for the hydraulic drive is arranged outside of the processing device.

8. Device according to claim 7, characterized in that the speed of both rotating tools is different.

9. Device according to claim 1, characterized in that the suction plates can be automatically moved onto the wall by way of working cylinders, whereby a vacuum device generates a negative pressure on the suction plates.

10. Method for removing contaminated materials from a wall, characterized in that a device is used in the method and the method contains the following remote-controlled working steps:
    a) moving a support system onto a wall using a dolly, whereby a processing device to remove contaminated materials from the wall is arranged in the support system;
    b) applying suction plates to the wall by pressing the working cylinders assigned to the suction plates;
    c) generating negative pressure beneath the suction plates and thus fixing of the support system to the wall by pressing the vacuum device;
    d) approaching of processing device to the wall so that a rotating tool with saw blades arranged in the processing device and then a rotating tool with impact cutters arranged in the processing device can process the wall in succession;
    e) moving the processing device within the support system in a vertical direction so that a vertically running web is processed on the wall;
    f) extending the support system by vertically extending the telescopically designed columns;
    g) If the max. height is reached, shutting down the support system, deactivating the processing device and returning it to the original starting position, removing the suction plates from the wall and moving the support system horizontally by a web width through use of the dolly;
    h) repeating steps b) to g).

* * * * *